(12) United States Patent
Xu et al.

(10) Patent No.: US 7,122,922 B2
(45) Date of Patent: Oct. 17, 2006

(54) BASE PLATE FOR SPINDLE MOTOR

(75) Inventors: Mo Xu, Singapore (SG); Victor C. Choo, Singapore (SG); YiRen Hong, Singapore (SG); PohLye Lim, Singapore (SG); SiewMing Ng, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 125 days.

(21) Appl. No.: 10/688,399

(22) Filed: Oct. 16, 2003

(65) Prior Publication Data

US 2004/0232782 A1 Nov. 25, 2004

Related U.S. Application Data

(60) Provisional application No. 60/472,304, filed on May 20, 2003.

(51) Int. Cl.
*H02K 5/24* (2006.01)
*H02K 15/14* (2006.01)

(52) U.S. Cl. ............... 310/51; 310/90; 310/67 R; 310/91; 360/99.04; 360/99.08; 360/98.07

(58) Field of Classification Search .......... 310/90, 310/67 R, 51, 91; 360/99.08, 99.04, 98.07
See application file for complete search history.

(56) References Cited

U.S. PATENT DOCUMENTS

| | | | | |
|---|---|---|---|---|
| 4,814,914 A | * | 3/1989 | Hagiwara et al. | 360/98.08 |
| 4,998,033 A | * | 3/1991 | Hisabe et al. | 310/67 R |
| 5,452,156 A | * | 9/1995 | Uda et al. | 360/97.01 |
| 5,479,304 A | * | 12/1995 | Morita | 360/98.07 |
| 6,005,748 A | * | 12/1999 | Heine et al. | 360/99.08 |
| 6,844,636 B1 | * | 1/2005 | Lieu et al. | 310/43 |

FOREIGN PATENT DOCUMENTS

JP 07007883 A * 1/1995

* cited by examiner

*Primary Examiner*—Darren Schuberg
*Assistant Examiner*—Yahveh Comas
(74) *Attorney, Agent, or Firm*—Wax Law Group

(57) ABSTRACT

A base plate for a spindle motor is provided defining a minimal axial gap with a relatively rotatable magnet. In an example, a surface of the base plate is positioned at 0.1 mm from an adjacent surface of a relatively rotatable magnet. The base plate is comprised of a composite material such that stiffness is improved and acoustic vibration is reduced, while maintaining low power consumption and a fast start-up time. A first material, being a nonmagnetic material is employed adjacent to a motor magnet, and a second material having a preferred stiffness is employed at a greater radial distance from the magnet than the radial distance between a stator and the magnet.

20 Claims, 5 Drawing Sheets

BASE PLATE FOR SPINDLE MOTOR

CROSS REFERENCE TO RELATED APPLICATION

This application is based on a provisional application Ser. No. 60/472,304, filed May 20, 2003, titled Composite Motor And Base Interface For Micro Hard Disk Drive, and assigned to the Assignee of this application and incorporated herein by reference.

FIELD OF THE INVENTION

The invention relates generally to spindle motors, and more particularly to a composite material base plate for a minimally sized disc drive.

BACKGROUND OF THE INVENTION

A high demand presently exists for disc drive memory systems, which are widely utilized throughout the world today in traditional computing environments and more recently in additional environments. These disc drive memory systems are used by computers and more recently by devices including digital cameras, digital video recorders, laser printers, photo copiers, jukeboxes, video games and personal music players. Consequently, the demands on disc drive memory systems has intensified because of increased performance demands and new environments for usage.

Disc drive memory systems store digital information that is recorded on concentric tracks of a magnetic disc medium. Several discs are rotatably mounted on a spindle, and the information, which can be stored in the form of magnetic transitions within the discs, is accessed using read/write heads or transducers. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the shaft. One type of motor is known as an in-hub or in-spindle motor, which typically has a spindle mounted by means of a bearing system to a motor shaft disposed in the center of the hub. The bearings permit rotational movement between the shaft and the hub, while maintaining alignment of the spindle to the shaft. The read/write heads must be accurately aligned with the storage tracks on the disc to ensure the proper reading and writing of information.

Spindle motors have in the past used conventional ball bearings between the hub and the shaft. However, the demand for increased storage capacity and smaller disc drives has led to the read/write head being placed increasingly close to the disc surface. The close proximity requires that the disc rotate substantially in a single plane. A slight wobble or run-out in disc rotation can cause the disc to strike the read/write head, possibly damaging the disc drive and resulting in loss of data. Conventional ball bearings exhibit shortcomings in regard to these concerns. Imperfections in the raceways and ball bearing spheres result in vibrations. Also, resistance to mechanical shock and vibration is poor in the case of ball bearings, because of low damping. Vibrations and mechanical shock can result in misalignment between data tracks and the read/write transducer. These shortcomings limit the data track density and overall performance of the disc drive system. Because this rotational accuracy cannot be achieved using ball bearings, disc drives currently utilize a spindle motor having fluid dynamic bearings between a shaft and sleeve to support a hub and the disc for rotation. One alternative bearing design is a hydrodynamic bearing.

In a hydrodynamic bearing, a lubricating fluid such as gas or liquid or air provides a bearing surface between a fixed member and a rotating member of the disc drive. Hydrodynamic bearings eliminate mechanical contact vibration problems experienced by ball bearing systems. Further, hydrodynamic bearings can be scaled to smaller sizes whereas ball bearings have smallness limitations. Efforts have been made to design smaller profile disc drives without loss of performance including maintaining low power consumption. One reduced sized disc drive having a 5 mm thickness currently on the market is the one-inch disc drive used with a CF card type II form factor.

In reducing size, there is a trend to reduce the axial height of the fluid dynamic bearing motor. The axial height of a gap between the base plate and the magnet is one motor section of interest to be minimized. Two types of base plate materials are currently utilized for a 1-inch disc drive, namely, aluminum and steel. While a stamped and machined steel base plate is less expensive and stiffer than casted and machined aluminum, as a steel base plate is positioned increasingly closer to a magnet, bearing friction and power consumption increases, resulting in a start-up delay due to magnetic flux and attraction force between the magnet and the steel base plate. Therefore, simply reducing the gap between the magnet and a steel base plate is unsatisfactory and problematic.

A demand exists for smaller mobile applications including smaller portable computers, and it has become essential in the industry to design disc drives having even smaller dimensions while maintaining motor stiffness and low power consumption. For example, a CF card type I form factor requires a disc drive having a 3.3 mm thickness but such disc drive does not currently exist. Space constraint, stiffness and low power consumption design issues currently remain unresolved. What is needed is a hard disc drive having a 3.3 mm thickness or less, which meets stiffness, power consumption, vibration and acoustic requirements.

SUMMARY OF THE INVENTION

A base plate for a spindle motor is provided defining a minimal axial gap with a relatively rotatable magnet. In an embodiment, a surface of the base plate is positioned at 0.1 mm from an adjacent surface of a relatively rotatable magnet. The base plate is comprised of materials such that stiffness is improved and acoustic vibration is reduced, while maintaining low power consumption and a fast start-up time. In an embodiment, run current power consumption is reduced by about thirty percent as compared to power consumption of conventionally used base plate component materials.

Features of the invention are achieved in part by utilizing a composite material base plate. A first material, being a nonmagnetic material is employed adjacent to a motor magnet. A second material having a preferred stiffness is employed at a greater radial distance from the magnet than the radial distance between the inside diameter of a stator and the magnet. In an embodiment the base plate is formed of a steel portion and of an aluminum portion. A minimal axial gap and low power consumption is achieved by using aluminum for a portion of the base plate adjacent to the magnet, and base plate stiffness, low vibration and acoustics is achieved by using steel for a portion of the base plate distant from the magnet. The nonmagnetic material and the second material are fixed together at an interface and the invention provides several interface forms including a straight interface, stepped interface, sloped interface, and a combination of the stepped and sloped interface.

Other features and advantages of this invention will be apparent to a person of skill in the art who studies the invention disclosure. Therefore, the scope of the invention will be better understood by reference to an example of an embodiment, given with respect to the following figures.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE INVENTION

Exemplary embodiments are described with reference to specific configurations. Those of ordinary skill in the art will appreciate that various changes and modifications can be made while remaining within the scope of the appended claims. Additionally, well-known elements, devices, components, methods and the like may not be set forth in detail in order to avoid obscuring the invention.

The disc drive industry currently is in need of and demands disc drive motors having ever smaller dimensions with sustained performance, including satisfactory motor stiffness, low power consumption and low acoustic vibration. Simply reducing gaps between components has proven to be unsatisfactory. As discussed in the Background of the Invention above, by reducing a gap between a steel base plate and a magnet within a disc drive motor, power consumption and start up time is increased due to magnetic interaction. Experimentation has also shown that when steel having nonmagnetic qualities is utilized for the base plate (i.e., 300 series stainless steel), increased power consumption and slower start up time again results. The steel having nonmagnetic qualities likely becomes magnetic when subjected to machining or heat processing, which are necessary processes for forming a base plate. When the gap between the steel and the magnet is increased by about 0.3 mm. (millimeters), the attraction force is reduced. However, since the current interest is to reduce axial height of a spindle motor and therefore reduce the gap, increasing the gap is unsatisfactory. Therefore, altering the magnet dimensions and shifting the magnet were examined. However, when magnet dimensions are reduced, an increase in power consumption and run current is experienced. Similarly, when the magnet center is shifted in an axial direction, thereby offsetting the magnet centerline and the stator centerline, an increase in noise level and vibration results. Therefore, a need continues to exist for a reduced spindle motor axial gap wherein stiffness, power consumption, vibration and acoustic requirements are met.

An apparatus and method is described herein for providing a minimal axial gap for a spindle motor, while maintaining low power consumption, fast start-up time, stiffness and low acoustic vibration. It will be apparent that features of the discussion and claims may be utilized with disc drives, spindle motors, various fluid dynamic bearing designs including hydrodynamic and hydrostatic bearings, and other motors employing a stationary and a rotatable component. Further, embodiments of the present invention may be employed with a fixed shaft, rotating shaft, conical bearings, etc.

As used herein, the terms "axially" or "axial direction" refers to a direction along a centerline axis length of the rotating shaft, and "radially" or "radial direction" refers to a direction perpendicular to the centerline length of the rotating shaft.

Figure 1:
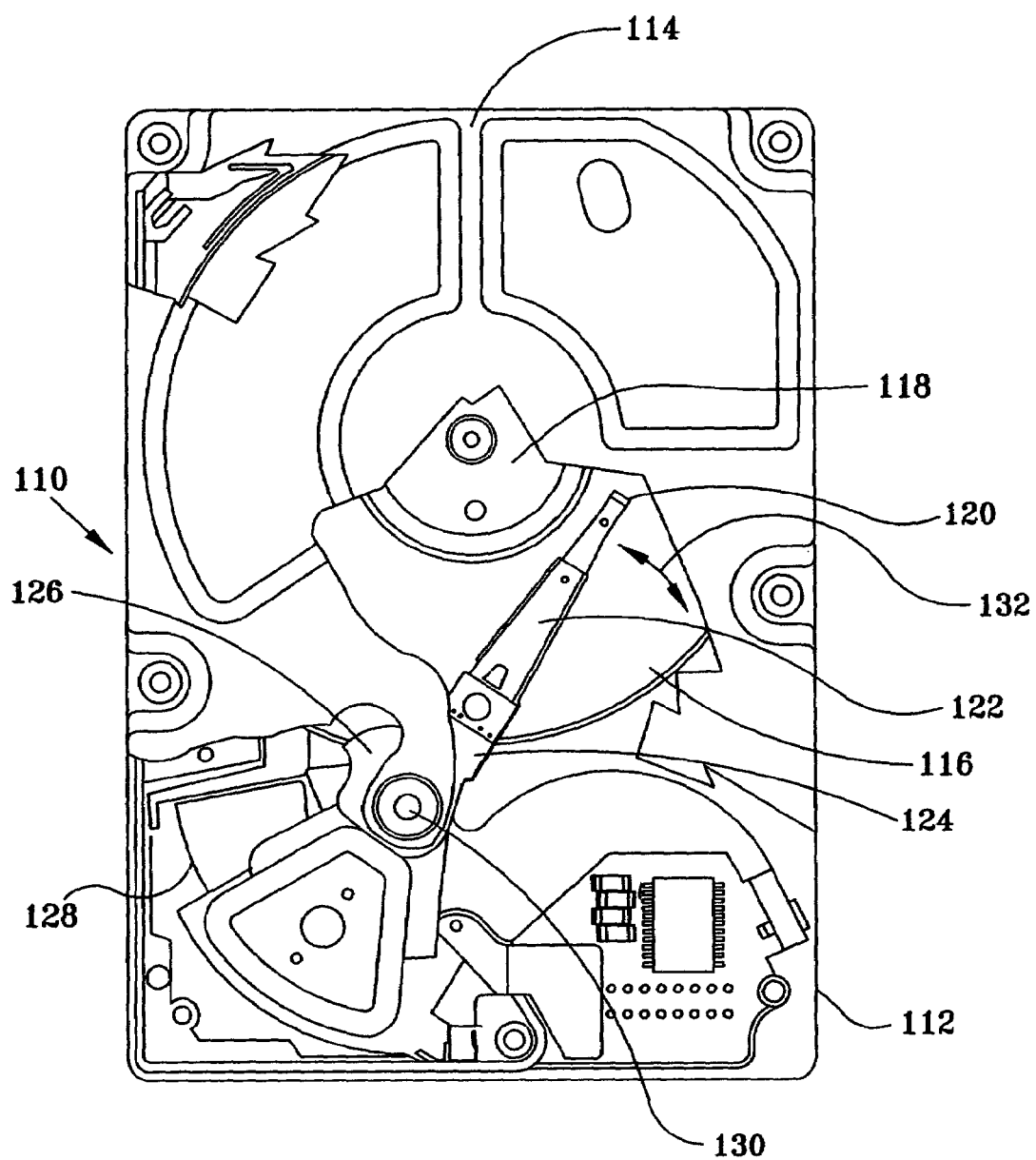
FIG. 1 is a top plain view of a disc drive data storage system in which the present invention is useful, in an embodiment.

Referring to the drawings wherein identical reference numerals denote the same elements throughout the various views, FIG. 1 illustrates a typical disc drive data storage device 110 in which the present invention is useful. Clearly, features of the discussion and claims are not limited to this particular design, which is shown only for purposes of the example. Disc drive 110 includes housing base 112 that is combined with cover 114 forming a sealed environment to protect the internal components from contamination by elements outside the sealed environment. Disc drive 110 further includes disc pack 116, which is mounted for rotation on a spindle motor (not shown) by disc clamp 118. Disc pack 116 includes a plurality of individual discs, which are mounted for co-rotation about a central axis. Each disc surface has an associated head 120 (read head and write head), which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arcuate path 132. This allows heads 120 to read and write magnetically encoded information on the surfaces of discs 116 at selected locations.

Figure 2:
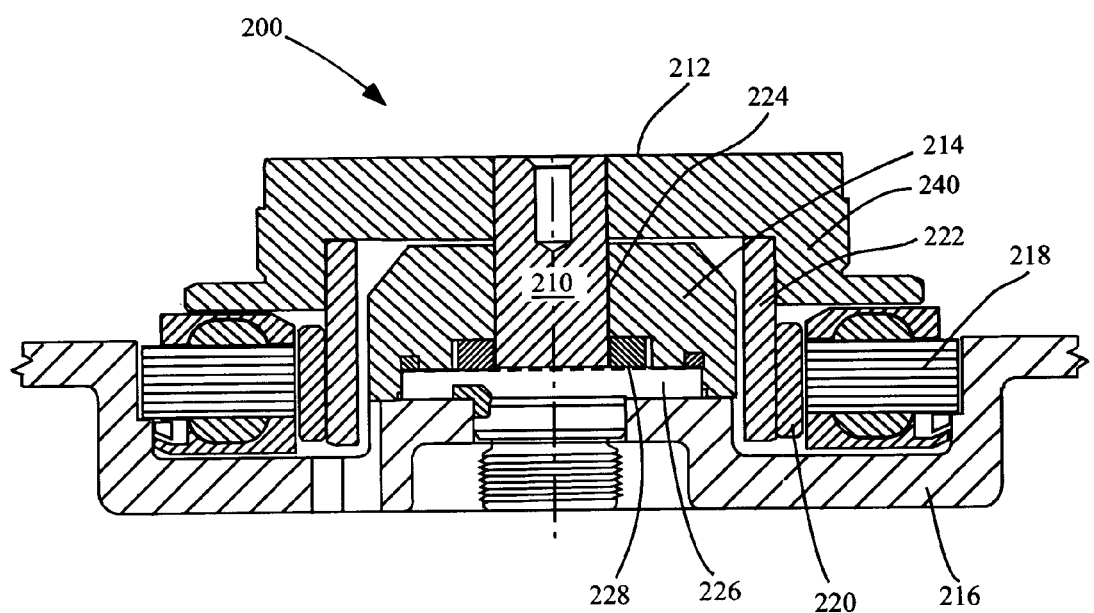
FIG. 2 is a sectional side view of a hydrodynamic bearing spindle motor with a rotating shaft used in a disc drive, in which the present invention is useful.

FIG. 2 is a sectional side view of a hydrodynamic bearing spindle motor 200 used in disc drives 110 in which the composite material base plate of the present invention is useful. Typically, spindle motor 200 includes a stationary component and a rotatable component. Spindle motor 200 incorporates a rotating shaft 210 in the design shown. The rotatable components include shaft 210, thrust plate 228, hub 212, backiron 222, and magnet 220. The stationary components include sleeve 214, counterplate 226, base plate 216 and stator 218. Rotating shaft 210 rotates within a sleeve 214 having a bore. Sleeve 214 cooperates with an integral, single piece threaded counterplate 226 to define the bearing gap 224 within which shaft 210 rotates. Counterplate 226 cooperates with surfaces of thrust plate 228 to establish a fluid dynamic thrust bearing that supports shaft 210 for relative rotation. A fluid dynamic journal bearing is established in the gap or chamber 224 between the sleeve 214 and the rotating shaft 210 and the thrust plate 228 supported on the shaft 210. The shaft 210 and thrust plate 228 are supported for rotation by fluid between the surfaces of the shaft 210 and thrust plate 228, and the corresponding inner surfaces of the sleeve 214 and the threaded counterplate 226. These surfaces have patterns of grooves thereon to establish appropriate pressures in the fluid and support the shaft 210 for rotation. Shaft 210 and hub 212 additionally are affixed to backiron 222 and magnet 220, backiron 222 mounted to an end of shaft 210. Further, sleeve 214 and counterplate 226 are affixed to base 216. Hub 212 includes a central core and a disc carrier member 240, which supports disc pack 116 (shown in FIG. 1) for rotation about shaft 210. Disc pack 116 is held on disc carrier member 240 by disc clamp 118 (also shown in FIG. 1).

Magnetic Flux

A magnetic field around magnet 220 interacts with an electromagnetic force generated by stator winding 218 attached to the base plate 216, producing a force that causes hub 212 to rotate. Magnet 220 acts as a rotor for spindle motor 200 and can be formed as a unitary, annular ring or can be formed of a plurality of individual magnets that are spaced about the periphery of hub 212. Magnet 220 can be formed of a neodymium-iron-boron bipolar magnet. Magnet 220 is magnetized to form one or more magnetic poles. Due to high demands for disc drives having a fast rotor rpm; increasingly stronger magnet assemblies are used. One problem with these powerful magnet assemblies is that the magnetic flux that is produced is not completely contained to interacting with the stator. As a result, stray magnetic flux impinges upon other components and can affect motor performance. For example, the magnetic flux from magnet 220 can interact with a magnetic steel base plate thereby increasing power consumption and start up time.

Figure 3:
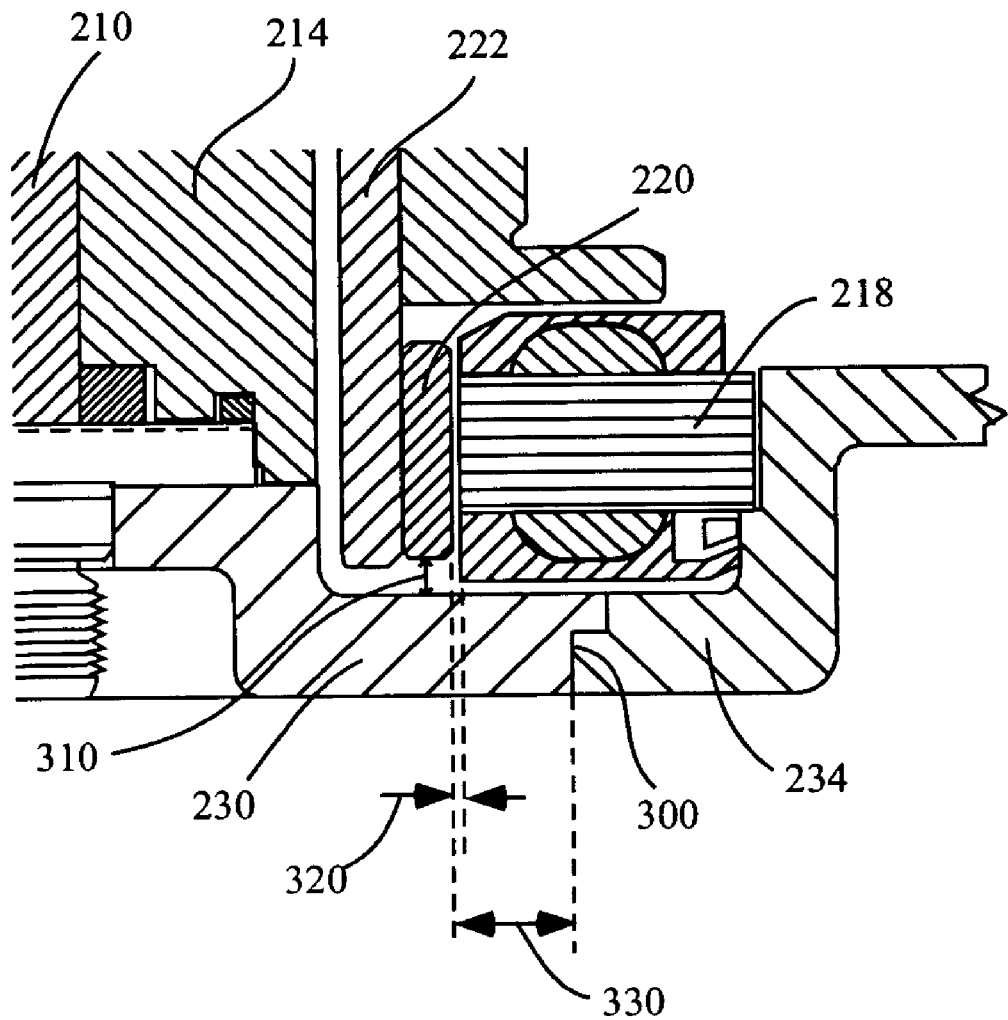
FIG. 3 is a sectional side view of the hydrodynamic bearing spindle motor of FIG. 2, with the magnet-base plate gap enlarged for visual illustrative purposes.

FIG. 3 shows another sectional side view of the hydrodynamic bearing spindle motor of FIG. 2, with the magnet-base plate gap enlarged for visual illustrative purposes. The present invention provides a spindle motor having a minimal axial gap 310 between magnet 220 and base plate 230 that is adaptable for use in a low profile disc drive. The base plate is comprised of a composite material (materials 230 and 234) such that stiffness is improved and acoustic vibration is reduced, while maintaining low power consumption and a fast start-up time.

Base Plate Composition

Numerous factors are taken into consideration in selecting the composition and material positioning of a base plate including magnetic flux interaction, power consumption, start up time, stiffness, vibration and acoustic impedance. As used herein, the term "composite material" means a material made up of distinct and separate interconnected materials. The materials are interconnected to produce structural and functional properties that are not present in individual materials currently utilized by disc drives.

In an embodiment, steel (including 300 series stainless steel) is utilized for the base plate material 234 formed distant to magnet 220, and aluminum is utilized for the base plate material 230 formed adjacent to magnet 220. Power consumption and start-up time are unaffected by any magnetic flux from magnet 220 to aluminum. Other nonmagnetic materials may be employed for base plate material 230 formed adjacent to magnet 220 including copper, magnesium, titanium, etc. Further, other materials having material qualities similar to steel (including equivalent stiffness) can be utilized for base plate material 234.

Minimal Axial Gap

By utilizing a nonmagnetic material such as aluminum for the base plate adjacent to magnet 220, a minimal axial gap 310 is provided. In an embodiment, the axial gap 310 between adjacent surface of magnet 220 and base plate 230 is 0.1 mm, and is provided for use in a low profile disc drive, such as a CF card type I form factor requiring a disc drive having a 3.3 mm thickness. Further, the axial gap 310 can be set at a gap exceeding 0.1 mm, including the conventional axial gap dimension of 0.3 mm. As provided by the present invention, in an embodiment, the lower range of axial gap 310 is about 0.6 mm to 0.1 mm, the minimum axial gap 310 limited by the machining process capability rather than undesirable consequences of a magnetic flux interaction between the magnet 220 and the base plate 230. It is to be appreciated that as the machining process capability advances, the minimal axial gap 310 may further be decreased. The minimal axial gap is defined, as used herein, as the smallest gap that can be formed, the limiting factor being current machining process capabilities including parallelism, flatness capabilities and slight process variations (tolerance stack-up) when the magnet and base plate are machined.

Radial Distances

As provided by the invention, the radial distance 330 from the magnet 220 to the steel base plate 234 is greater than the radial distance 320 from the magnet 220 to the inside diameter of a stator 218. In an embodiment, the radial distance 330 from the magnet 220 to the steel base plate 234 is five times the radial distance 320 from the magnet 220 to the inside diameter of the stator 218. It is to be appreciated that as the magnetism or magnetic flux of magnet 220 is increased with alternative designs, the radial distance 330 would require an increase as well, for unchanged power consumption.

Reduced Power Consumption and Start-up Time

Start up is the process of beginning to rotate the media to prepare the media for a read or write operation by the read/write transducer head. At startup, a high applied torque needs to be applied as a result of the high viscosity of bearing lubricant. Accelerating a spindle motor from rest involves a number of important considerations that must be considered. Complicating matters of startup with magnet-base plate magnetic interaction must be avoided. Application of current to phase windings about stator 218 induces electromagnetic fields which interact with the magnetic fields of magnets 220 to apply torque to the spindle motor hub 212 and induce rotation of the discs during startup. The spindle motor is initially accelerated from rest to a first velocity. Once the first velocity is reached, a high gear mode is employed wherein the spindle motor is accelerated from the first velocity to an intermediate velocity greater than the first velocity. Thereafter, the spindle motor is accelerated from the intermediate velocity to the final operational velocity. For purposes of the present discussion, exemplary values are about 250 revolutions per minute (rpm) for the first velocity, about 1,000 rpm for the intermediate velocity and about 15,000 rpm for the operational velocity. Smooth and continuous transitions in spindle motor velocity are necessary.

The present invention provides a minimal axial gap 310 with reduced power consumption and reduced startup time as compared to conventional designs. By employing the composite material base plate with the minimal axial gap 310, performance of the spindle motor, including power consumption and start-up time, is unaffected by any magnetic flux interaction between magnet 220 and base plate materials 230 and 234.

In an embodiment, run current power consumption is reduced by about thirty percent as compared to power consumption with conventionally used base plate component materials. That is, in a conventionally used base plate, a run current of about 60 mA is utilized when the axial gap between the magnet and the base plate is set at 0.1 mm. Further, in some cases, when the composite material of the present invention is not utilized and the axial gap is set at 0.1 mm, startup is not attained because of the magnetic attraction force between the steel base plate and the magnet. However, when a composite material of the present invention is employed, a run current of about 40 mA is utilized when the axial gap 310 is set at 0.1 mm and a radial gap 330 is five times the radial gap 320. These run current measurements are observed under normal disc drive operating conditions and room temperature.

Improved Stiffness

A composite material including aluminum and steel is utilized in an embodiment for the base plate, providing a base plate with improved stiffness over an aluminum base plate. Aluminum alone lacks the stiffness or rigidity of heavier materials, such as steel. The Young's modulus for steel is $30 \times 10^6$ lb/in$^2$, while the Young's modulus for aluminum is $10 \times 10^6$ lb/in$^2$. Young's modulus is the ratio of stress to strain for a bar of a given substance. Young's modulus is the elastic modulus for tension, or tensile stress, and is the force per unit cross section of the material divided by the fractional increase in length resulting from the stretching of a standard rod or wire of the material. As can be observed, steel has a Young's modulus ratio of about three times the Young's modulus for aluminum.

In an embodiment, steel can be substituted for a predefined similarly stiff material and the thickness of the base plate can be adjusted. As described herein, a predefined stiffness is a stiffness (having a Young's modulus analogous to steel) wherein spindle motor design requirements are met including reduced vibration and acoustic vibrations. That is, the described composite base plate (using aluminum and steel) is inherently stiff, tending to reduce the spindle motors susceptibility to the excitation of structural mechanical resonances, which reduces undesirable acoustic noise.

Reduced Vibration and Acoustic Vibration

A trend in the disc drive industry is to reduce the level of acoustic emissions or noise generated by disc drives. One primary source of noise is idle noise, which results from the operation of the spindle motor and its associated rotating discs. The continuous interaction between the stator 218 and the rotor tends to create a torsional resonance in the stator 218. As stator 218 applies a force to the rotor to control the rotational speed of the rotor, a counter-force is applied by the rotor to stator 218 in the opposite direction. This reaction force causes stator 218 to vibrate. Vibrations in stator 218 create acoustic noise by transmission of vibrations to the disc drive housing. Due to the rigid coupling of stator 218 to the base plate 216, stator 218 vibrations transmitted to base plate 216 represent a significant source of acoustic noise. The vibrations to the base plate 216 vibrate together with stator 218 and radiate sound across the larger surface area of the base plate 216. The amplitude of the sound depends in part on the relative acoustic impedance of base plate 216. The acoustic impedance of a material is equal to the product of the density of the material and the speed of sound in the material. Aluminum (bulk) has a density of 2700 kg/m$^3$, and steel (bulk) has a density of 7700 kg/m$^3$.

A composite material base plate including aluminum and steel for base plate materials 230 and 234, provided by an embodiment of the present invention, has satisfactory acoustic impedance, thereby reducing idle noise. The ability of the composite material base plate to reduce or absorb vibrations has a significant impact on the performance of a disc drive (i.e., the ability of the drive to support high track and bit densities and fast spin rates) as well as on the acoustic noise generated by the drive.

Figure 4:
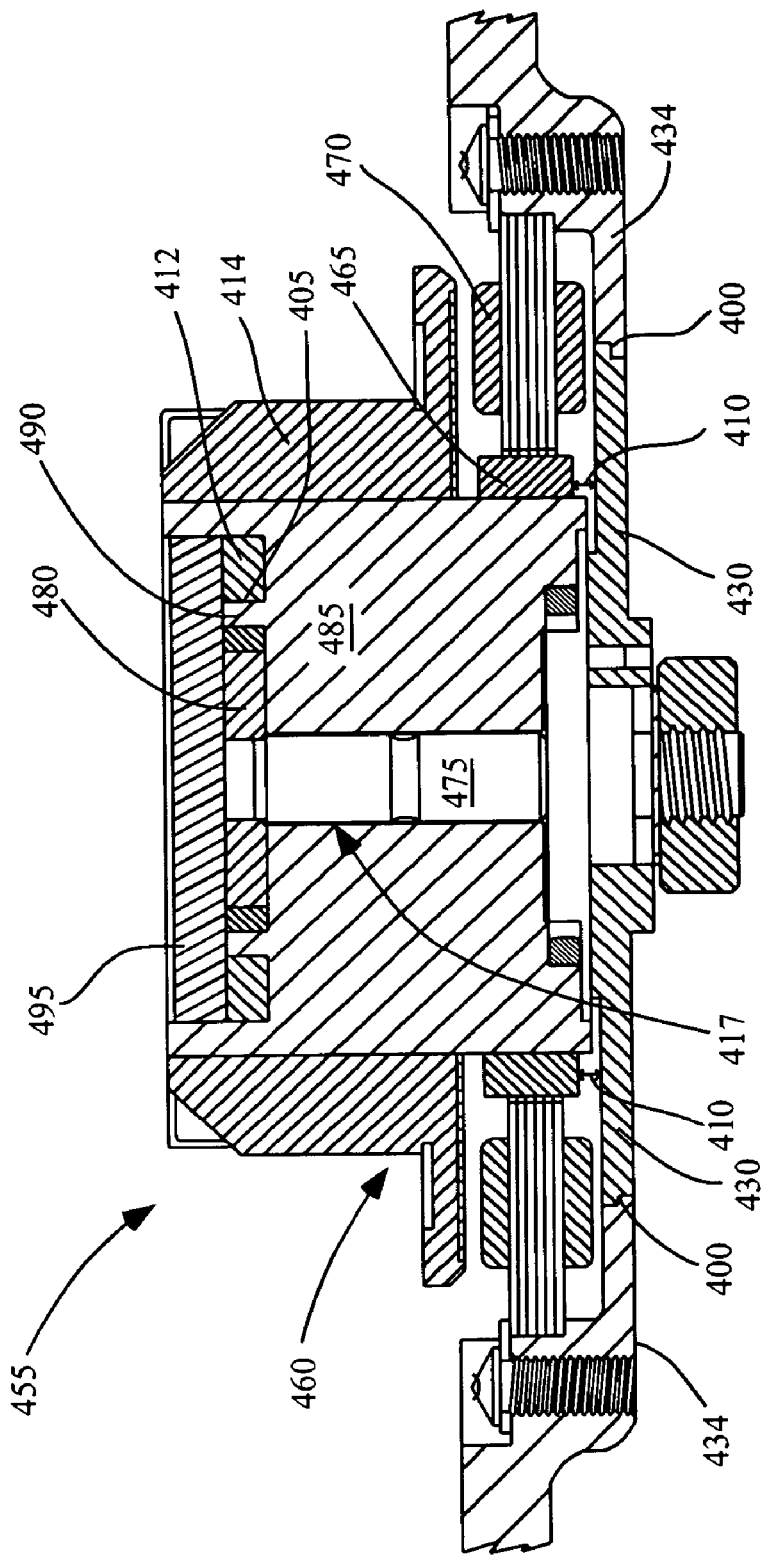
FIG. 4 is a sectional side view of a hydrodynamic bearing spindle motor with a rotating sleeve used in a disc drive, in which the present invention is useful.

Embodiments of the present invention can be employed with a spindle motor having a rotating shaft as in FIG. 2 and can additionally be employed with a rotating sleeve as shown in FIG. 4. FIG. 4 is a sectional side view of a hydrodynamic bearing spindle motor 455 used in disc drives 110 in which the composite material base plate of the present invention is further useful. In this design, the rotatable component includes sleeve 485 and the stationary component includes shaft 475 that is fixed and attached to base 430. The rotatable component further includes hub 460 having one or more magnets 465 attached to a periphery thereof. Like the design in FIG. 2, magnets 465 interact with stator 470 attached to base 434 to cause hub 460 to rotate. The hub 460 is supported on shaft 475 having thrustplate 480 on one end. The thrustplate 480 can be an integral part of shaft 475, or it can be a separate piece which is attached to shaft 475, for example, by a press fit. The shaft 475 and thrustplate 480 fit into sleeve 485 and a thrustplate cavity 490 in hub 460. A counter plate 495 is provided above thrustplate 480 resting on an annular ring 405 that extends from hub 460. Counterplate 495 provides axial stability for the hydrodynamic bearing and positions hub 460 within spindle motor 455. An O-ring 412 is provided between counterplate 495 and hub 460 to seal the hydrodynamic bearing and to prevent hydrodynamic fluid from escaping. Hub 460 includes a disc carrier member 414, which supports disc pack 116 (shown in FIG. 1) for rotation about shaft 475. Disc pack 116 is held on disc carrier member 414 by disc clamp 118 (also shown in FIG. 1). Hub 460 is interconnected with shaft 475 through hydrodynamic bearing 417 for rotation about shaft 475.

Embodiments of the present invention can minimize the axial gap 410 in a rotating sleeve 485 spindle motor. As in discussed in FIG. 2 and FIG. 3, by forming a composite material base plate, a minimal axial gap 410 can be formed. Aluminum is utilized for base plate material 430 formed adjacent to magnets 465, and steel is utilized for the base plate material 434 formed distant to magnets 465. Further, as discussed in FIG. 3, other nonmagnetic materials may be employed for base plate material 430 formed adjacent to magnets 465 including copper, magnesium, titanium, etc. Similarly, other materials having material qualities similar to steel (including equivalent stiffness) can be utilized for base plate material 434. The composite material base plate improves stiffness, reduces vibration and maintains low power consumption and acceptable start-up time.

FIG. 5A–5D show alternative embodiments of a composite material interface for a base plate used in a spindle motor. The selection of an interface structure for affixing composite base plate materials such as aluminum and steel includes material characteristic considerations and machining considerations including z-height tolerance, perpendicularity, parallelism and concentricity. In an embodiment, the non-magnetic portion of the base plate (i.e., the aluminum portion) is fixed to a steel portion by a known technique including one of press fit, laser welding, ultrasonic welding, epoxy, etc.

Figure 5A:
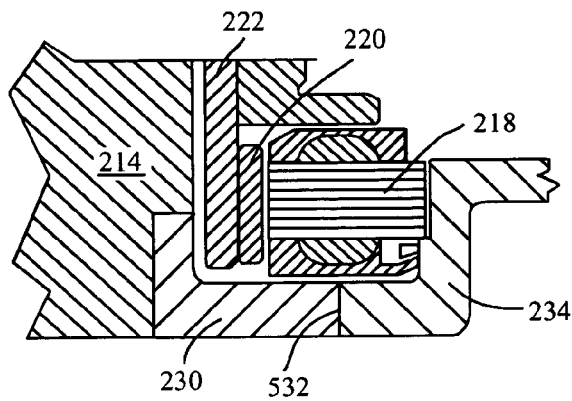
FIG. 5A is a sectional side view of the hydrodynamic bearing spindle motor of FIG. 2 illustrating a straight interface affixing materials making up a base plate, in an embodiment of the present invention.
Figure 5B:
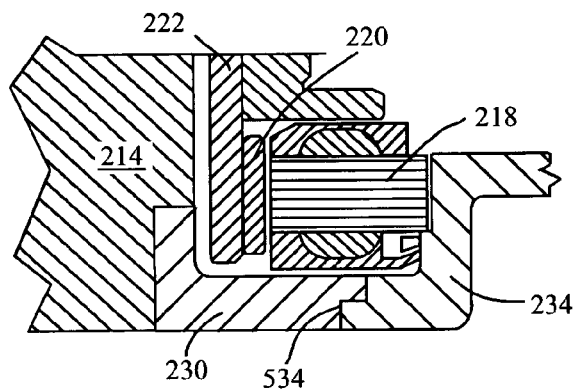
FIG. 5B is a sectional side view of the hydrodynamic bearing spindle motor of FIG. 2 illustrating a stepped interface affixing materials making up a base plate, in an embodiment of the present invention.
Figure 5C:
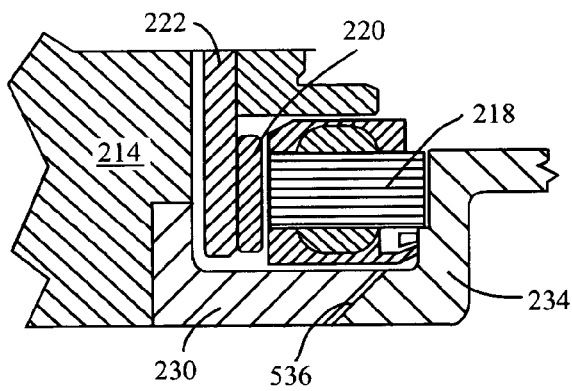
FIG. 5C is a sectional side view of the hydrodynamic bearing spindle motor of FIG. 2 illustrating a sloped interface affixing materials making up a base plate, in an embodiment of the present invention.
Figure 5D:
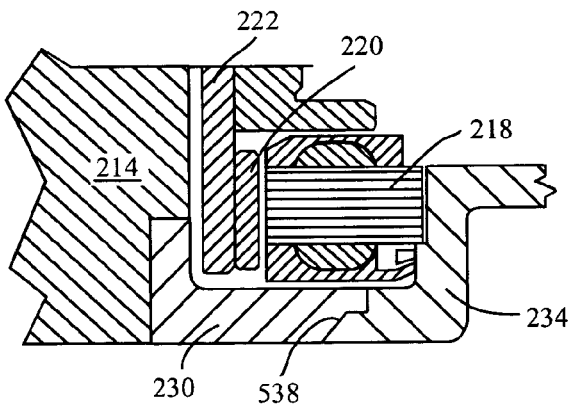
FIG. 5D is a sectional side view of the hydrodynamic bearing spindle motor of FIG. 2 illustrating a stepped-slopped interface affixing materials making up a base plate, in an embodiment of the present invention.

FIG. 5A shows a sectional side view of the hydrodynamic bearing spindle motor of FIG. 2 illustrating a straight interface 532 affixing material 230 (i.e., aluminum) and material 234 (i.e., steel) of the base plate, in an embodiment of the present invention. FIG. 5B illustrates a stepped interface 534 affixing material 230 and material 234 of the base plate, in another embodiment of the present invention. FIG. 5C illustrates a sloped interface 536 affixing material 230 and material 234 of the base plate, in a further embodiment of the present invention. FIG. 5D illustrates a stepped and sloped interface 538 affixing material 230 and material 234 of the base plate, in yet a further embodiment of the present invention.

Other features and advantages of this invention will be apparent to a person of skill in the art who studies this disclosure. For example, while the design in FIG. 2 shows a magnet situated between a shaft and a stator, it is to be appreciated that the present invention is also useful to spindle motor designs wherein the stator is situated between the shaft and the magnet. Thus, exemplary embodiments, modifications and variations may be made to the disclosed embodiments while remaining within the spirit and scope of the invention as defined by the appended claims.

We claim:

1. A spindle motor comprising: a rotatable component defining a bearing gap with a stationary component; a magnet affixed to the rotatable component; a stator, affixed to the stationary component, for generating an electromagnetic force that interacts with the magnet for driving the rotatable component, the stationary component including a base plate, wherein the base plate defines a minimal axial gap with the magnet, the base plate comprising a first material positioned adjacent to the magnet, and a second material having a predefined stiffness, wherein the second material is positioned at a greater radial distance from the magnet than the radial distance between the stator and the magnet, wherein the stator is positioned radially outside of the magnet and wherein the second material is positioned at least one of radially outside of the stator and axially adjacent to the stator.

2. The spindle motor as in claim 1, wherein the minimal axial gap is in the range of 0.06 mm to 0.1 mm.

3. The spindle motor as in claim 1, wherein the first material is a nonmagnetic material and the run current is about 40 mA.

4. The spindle motor as in claim 1, wherein the minimum radial distance from the magnet to the second material is at least five times greater than the minimum radial distance from the magnet to the stator.

5. The spindle motor as in claim 1, wherein the first material is comprised of one of aluminum, copper magnesium and titanium, and the second material is comprised of steel.

6. The spindle motor as in claim 1, wherein the first material and the second material are fixed together by one of a straight interface, a stepped interface, a sloped interface, and a combination of the stepped interface and the sloped interface.

7. The spindle motor as in claim 1, wherein the second material has a Young's modulus equal to or greater than steel.

8. The spindle motor as in claim 1, wherein the stationary component comprises a shaft and the rotatable component comprises a sleeve and a hub.

9. A spindle motor for incorporation into a disc drive storage system comprising: a rotatable component defining a bearing gap with a stationary component; a storage disc attached to one of the stationary component and the rotatable component; a magnet affixed to the rotatable component; a stator, affixed to the stationary component, for generating an electromagnetic force that interacts with the magnet for driving the rotatable component, the stationary component including a base plate, wherein the base plate defines a minimal axial gap with the magnet, the base plate comprising a first material positioned adjacent to the magnet, and a second material having a predefined stiffness, wherein the second material is positioned at a greater radial distance from the magnet than the radial distance between the stator and the magnet, wherein the stator is positioned radially outside of the magnet, and wherein the second material is positioned at least one of radially outside of the stator and axially adjacent to the stator.

10. The spindle motor as in claim 9, wherein the minimal axial gap is in the range of 0.06 mm to 0.1 mm.

11. The spindle motor as in claim 9, wherein the first material is a nonmagnetic material and the run current is about 40 mA.

12. The spindle motor as in claim 9, wherein the minimum radial distance from the magnet to the second material is at least five times greater than the minimum radial distance from the magnet to the stator.

13. The spindle motor as in claim 9, wherein the first material is comprised of one of aluminum, copper magnesium and titanium, and the second material is comprised of steel.

14. The spindle motor as in claim 9, wherein the first material and the second material are fixed together by one of a straight interface, a stepped interface, a sloped interface, and a combination of the stepped interface and the sloped interface.

15. The spindle motor as in claim 9, wherein the second material has a Young's modulus equal to or greater than steel.

16. The spindle motor as in claim 9, wherein the stationary component comprises a shaft and the rotatable component comprises a sleeve and a hub.

17. A method comprising: a rotatable component defining a bearing gap with a stationary component; a magnet affixed to the rotatable component; a stator, affixed to the stationary component, for generating an electromagnetic force that interacts with the magnet for driving the rotatable component, the stationary component including a base plate, wherein the base plate defines a minimal axial gap with the magnet, the base plate comprising a first material positioned adjacent to the magnet, and a second material having a predefined stiffness, wherein the second material is positioned at a greater radial distance from the magnet than the radial distance between the stator and the magnet, wherein the stator is positioned radially outside of the magnet and wherein the second material is positioned at least one of radially outside of the stator and axially adjacent to the stator.

18. The method as in claim 17, further comprising forming the minimal axial gap in the range of 0.06 mm to 0.1 mm.

19. The method as in claim 17, further comprising forming the first material of one of aluminum, copper magnesium and titanium, and forming the second material of steel, wherein the first material and the second material are fixed together by one of a straight interface, a stepped interface, a sloped interface, and a combination of the stepped interface and the sloped interface.

20. The method as in claim 17, further comprising forming a radial distance from the magnet to the second material at least five times greater than a radial distance from the magnet to the stator.

* * * * *